United States Patent
Arnold, Jr. et al.

(10) Patent No.: US 8,083,574 B2
(45) Date of Patent: Dec. 27, 2011

(54) EXHAUST FLUE CAP AND FILTER DEVICE FOR A GAS FIRED APPLIANCE

(75) Inventors: John G. Arnold, Jr., Tulsa, OK (US); Joseph D. Smith, Owasso, OK (US)

(73) Assignee: John G. Arnold, Jr., Tulsa, OK (US)

( * ) Notice: Subject to any disclaimer, the term of this patent is extended or adjusted under 35 U.S.C. 154(b) by 797 days.

(21) Appl. No.: 12/146,129

(22) Filed: Jun. 25, 2008

(65) Prior Publication Data

US 2009/0088060 A1    Apr. 2, 2009

Related U.S. Application Data

(60) Provisional application No. 60/975,693, filed on Sep. 27, 2007.

(51) Int. Cl.
*F23J 13/08* (2006.01)

(52) U.S. Cl. .......................................... 454/4

(58) Field of Classification Search .............. 454/4, 5, 454/6, 35, 36, 37, 367, 259, 339
See application file for complete search history.

(56) References Cited

U.S. PATENT DOCUMENTS

| | | | | |
|---|---|---|---|---|
| 2,803,184 | A * | 8/1957 | Wasserman | 454/36 |
| 3,361,051 | A * | 1/1968 | Fair et al. | 454/8 |
| 3,441,381 | A | 4/1969 | Keith et al. | |
| 3,885,977 | A | 5/1975 | Lachman et al. | |
| 4,138,220 | A * | 2/1979 | Davies et al. | 422/173 |
| 4,147,096 | A * | 4/1979 | Caswell | 454/20 |
| 4,397,225 | A * | 8/1983 | Patton | 454/368 |
| 4,399,743 | A * | 8/1983 | Izzi, Sr. | 454/367 |
| 4,476,852 | A * | 10/1984 | Lee et al. | 126/289 |
| 4,582,044 | A * | 4/1986 | Ferguson et al. | 126/289 |
| 4,593,504 | A * | 6/1986 | Bonnici et al. | 52/199 |
| 4,889,160 | A * | 12/1989 | Sheets | 137/588 |
| 5,228,847 | A * | 7/1993 | Lywood et al. | 431/7 |
| 5,749,780 | A * | 5/1998 | Harder et al. | 454/359 |
| 6,022,269 | A | 2/2000 | Arbucci | |
| 6,805,627 | B2 * | 10/2004 | Marts et al. | 454/368 |
| D503,471 | S | 3/2005 | Huta | |
| 6,926,600 | B1 | 8/2005 | Arnold, Jr. | |
| 6,978,803 | B2 * | 12/2005 | Brown et al. | 138/96 R |
| D535,010 | S | 1/2007 | Arnold, Jr. | |
| 7,179,164 | B2 | 2/2007 | Arnold, Jr. | |
| 7,276,929 | B2 * | 10/2007 | Arai et al. | 324/754.31 |
| D574,944 | S | 8/2008 | Arnold, Jr. | |

(Continued)

FOREIGN PATENT DOCUMENTS

DE    2057449    6/1972

(Continued)

*Primary Examiner* — Steven B McAllister
*Assistant Examiner* — Brittany E Towns
(74) *Attorney, Agent, or Firm* — Head, Johnson & Kachigian, P.C.

(57) ABSTRACT

An exhaust flue cap and filter device for a gas fired appliance in communication with an exhaust flue opening having an outer pipe and a coaxial liner. The device includes a tubular cap with an open lower end, an opposed open upper end, and a plurality of ventilation holes wherein the cap is receivable over the flue opening. A removable top is attached to and closes the open upper end of the tubular cap. A filter tray having a smaller diameter than the tubular cap includes a ledge extending radially inward from the tray. A removable catalytic converter filter insert within the tubular cap is supported on the ledge.

16 Claims, 2 Drawing Sheets

U.S. PATENT DOCUMENTS

2002/0104528 A1  8/2002  Staller

FOREIGN PATENT DOCUMENTS

| | | |
|---|---|---|
| DE | 2220023 | 11/1973 |
| DE | 8405331 | 5/1984 |
| DE | 4209225 | 9/1993 |
| EP | 0322570 | 7/1989 |
| FR | 1340447 | 10/1963 |
| JP | 60155822 | 8/1985 |
| WO | 2006110505 | 10/2006 |

* cited by examiner

EXHAUST FLUE CAP AND FILTER DEVICE FOR A GAS FIRED APPLIANCE

CROSS-REFERENCE TO PENDING APPLICATIONS

This application is based on and is entitled to the filing date of U.S. Provisional Patent Application Ser. No. 60/975,693 filed Sep. 27, 2007.

BACKGROUND OF THE INVENTION

1. Field of the Invention

The present invention is directed to an exhaust flue cap and filter device or appliance and a method of use for an exhaust flue opening of a gas fired appliance. In particular, the present invention is directed to an exhaust flue cap and filter device which will reduce carbon monoxide and particulate emissions from the exhaust of a gas fired appliance.

2. Prior Art

There are various types of known gas fired appliances that are used with buildings and residences. These include gas fired water heaters, gas fired boilers, gas fired fireplaces, gas logs fitted within fireplaces, gas fired air heating systems, gas fired clothes dryers, or other apparatus that use gaseous hydrocarbon fuels such as natural gas or propane.

For the most part, gas fired appliances are relatively efficient and do not produce the extensive amount of soot or other emissions associated with wood burning fireplaces and stoves or with coal burning fireplaces or stoves. Even gas fired appliances, however, produce a certain amount of particulate emissions and carbon monoxide emissions.

It is advisable and required by laws, codes, or regulations in many applications to vent a gas fired appliance from the building or residence outside to the atmosphere. There are various types and configurations of known venting systems. One type of double wall flue exhaust is known as a Type B double wall gas vent system. A Type B vent system includes an outer cylindrical wall along with a coaxial and concentric inner liner spaced from the outer wall.

Accordingly, the present invention is directed to an exhaust flue cap and filter appliance capable of reducing the carbon monoxide and particulate emissions from the exhaust of gas fired appliances.

The present invention is directed to an exhaust flue cap and filter device for a gas fired appliance that can be installed with new building or residence construction or can be retro-fit to an existing flue opening.

The present invention is directed to an exhaust flue cap and filter device for a gas fired appliance that reduces carbon monoxide and particulate emissions through a removable and replaceable catalytic filter insert.

The present invention is directed to an exhaust flue cap and filter device that will reduce carbon monoxide and particulate emissions while not substantially reducing flow through the exhaust flue.

The present invention is directed to an exhaust flue cap and filter device that permits bypass of exhaust gases in the event of any blockage of the filter component of the device.

SUMMARY OF THE INVENTION

The present invention is directed to an exhaust flue cap and filter device for a gas fired appliance and to a process or method to reduce carbon monoxide and unburned hydrocarbon emissions from the exhaust of a gas fired appliance.

The exhaust flue cap and filter device includes a tubular cap having a diameter larger than the exhaust flue opening. The tubular cap includes an open lower end, an opposed upper end, and a plurality of ventilation slots or vents between the lower end and the opposed upper end.

A removable top is attached to and closes the open upper end of the tubular cap. The removable top may be secured by fasteners or other mechanism to the tubular cap. The removable top may also include an optional outwardly extending rain flange to discourage rain or precipitation from entering the ventilation slots of the tubular cap.

A filter tray is suspended within the tubular cap and has a smaller diameter than the tubular cap. The filter tray may be suspended within the tubular cap by a series of standoffs. The filter tray has an open bottom and an open top and may include a downwardly and outwardly extending flared skirt to discourage rain or precipitation from entering the exhaust vent pipe and also to encourage flue gas to pass through the filter tray.

The filter tray includes a ledge extending radially inward to act as a support or shoulder to hold a removable filter insert which is received into the filter tray. The filter insert is catalytically active.

The exhaust flue cap and filter device also includes a cylindrical inner collar having a slightly larger diameter than the exhaust flue opening so that the inner collar fits over the exhaust flue opening. The inner collar is suspended within the tubular cap such as by a series of standoffs or by another mechanism.

In order to use the exhaust flue cap and filter device of the present invention, exhaust gases from the gas fired appliance are passed through the exhaust flue opening into the tubular cap. Atmospheric air is also allowed and permitted to pass into the tubular cap from the open lower end. The exhaust gases and the atmospheric air in the tubular cap are permitted to pass into and through the catalytic filter insert which is supported within the tubular cap. The exhaust gases are treated by the catalytic filter insert as they pass therethrough.

The treated exhaust gases which have passed through the filter insert pass from the tubular cap through a plurality of ventilation holes in the tubular cap to the atmosphere.

DETAILED DESCRIPTION OF THE PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Figure 1:
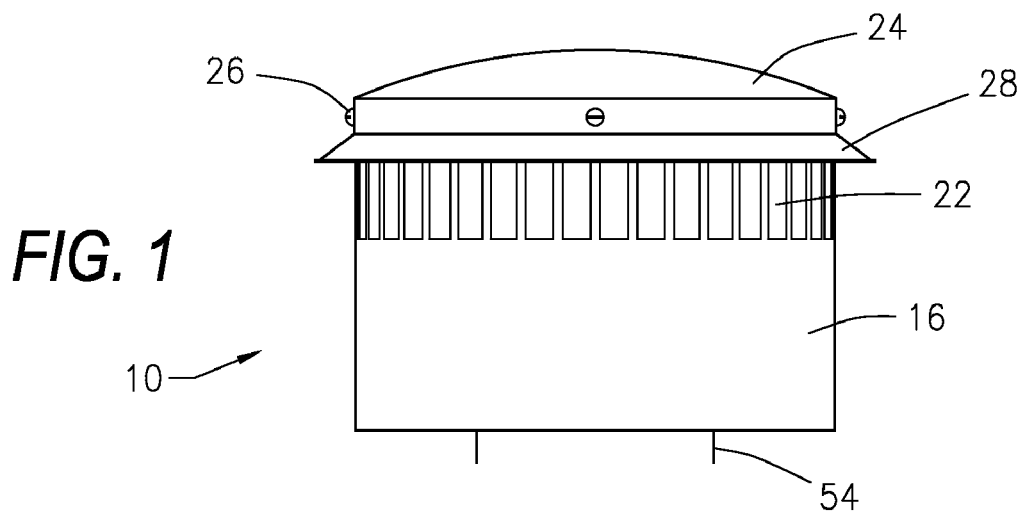
FIG. 1 illustrates a side view of an exhaust flue cap and filter device for a gas fired appliance exhaust flue opening constructed in accordance with the present invention.
Figure 2:
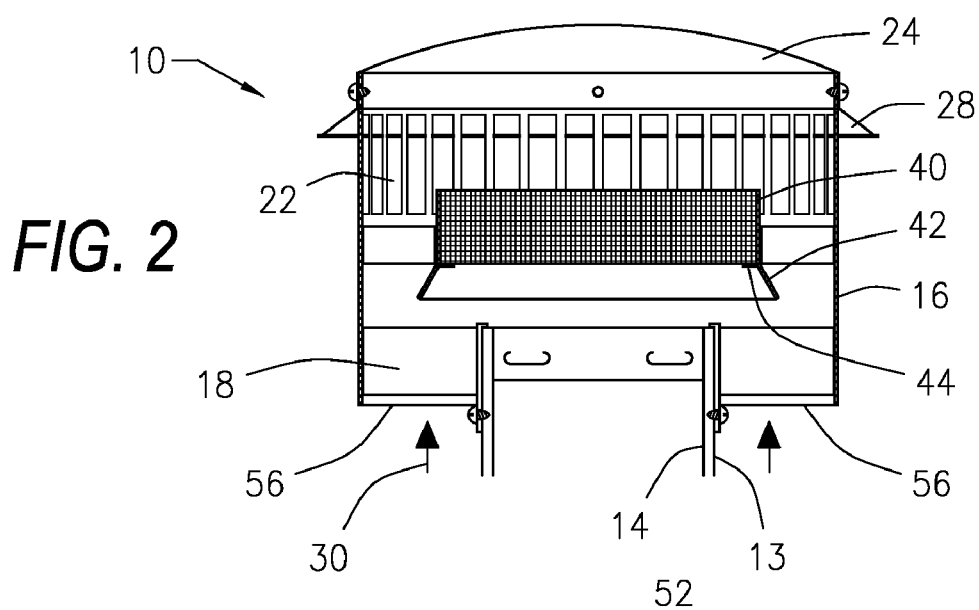
FIG. 2 illustrates a sectional view cut through the center of the exhaust flue cap and filter device shown in FIG. 1.
Figure 3:
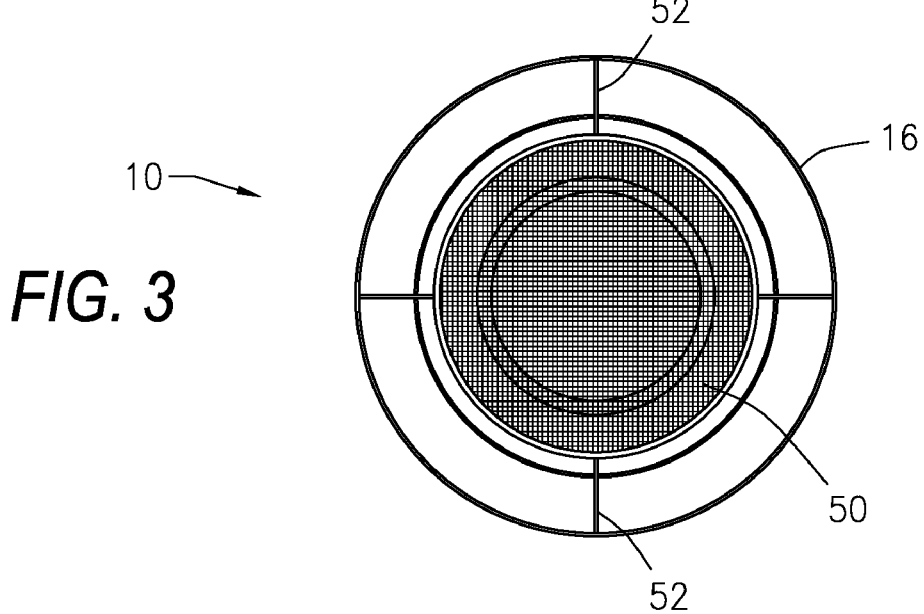
FIG. 3 illustrates a top view of the exhaust flue cap and filter device shown in FIG. 1 apart from the exhaust flue opening.

Referring to the drawings in detail, FIG. 1 illustrates a side or elevation view of a preferred embodiment of an exhaust flue cap and filter device 10 of the present invention. FIG. 2 illustrates a sectional view cut through the center of the exhaust device 10 shown in FIG. 1, and FIG. 3 illustrates a top view of the exhaust flue cap and filter device 10 with the removable top taken off of the device for ease of viewing.

Figure 4:
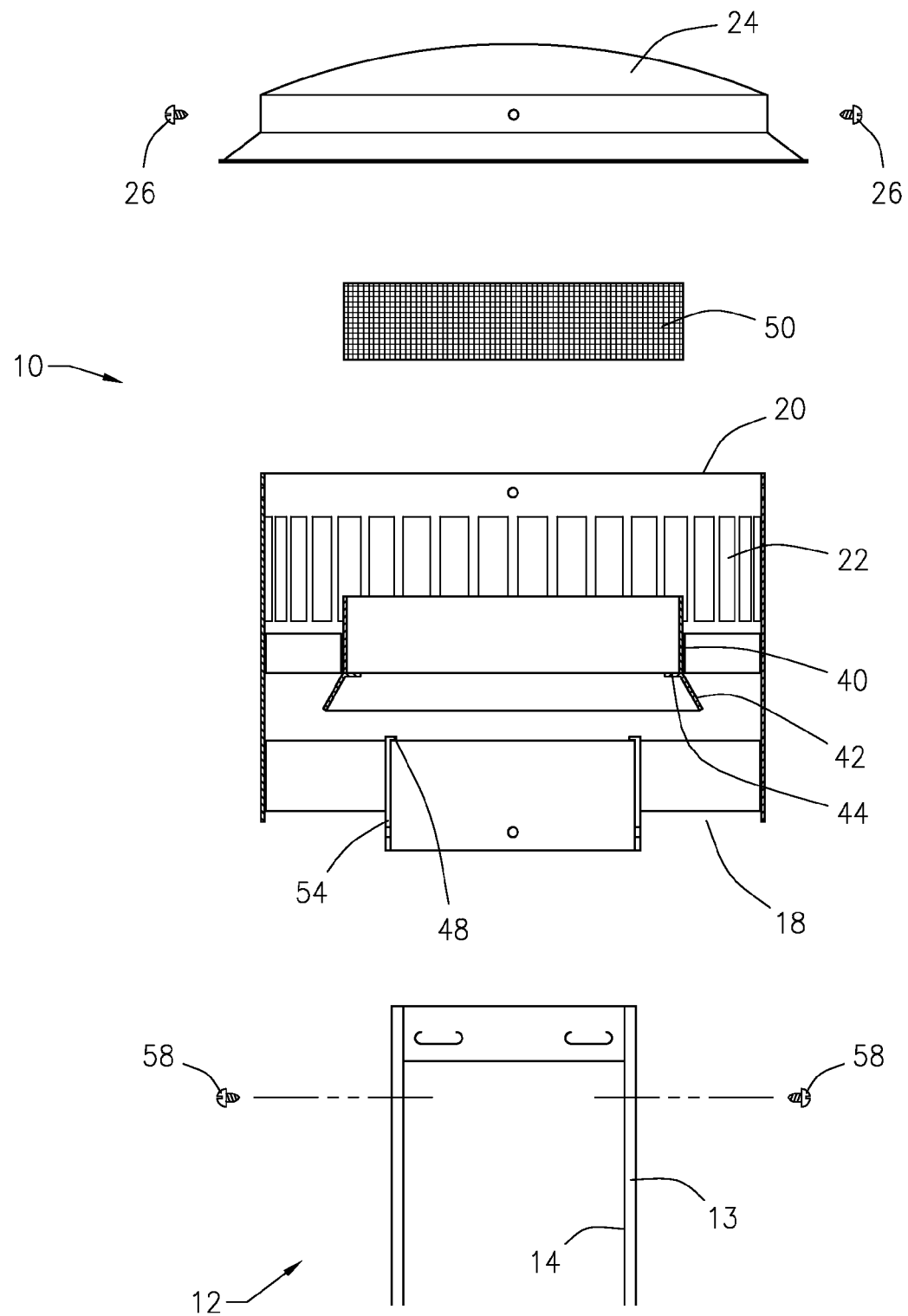
FIG. 4 illustrates an exploded view of the exhaust flue cap and filter device shown in FIGS. 1, 2 and 3 apart from the exhaust vent pipe flue opening.

FIG. 4 illustrates an exploded view of the exhaust flue cap and filter device 10 separated from an exhaust flue vent system 12 with portions cut-away for clarity.

The present invention operates with exhaust flue openings of various types and configurations. As best seen in FIGS. 1, 2 and 4, in one non-limiting embodiment, the exhaust flue cap and filter device 10 of the present invention may be utilized with a double wall exhaust system, such as a Type B double wall gas vent system which includes an outer cylindrical pipe 13 and a coaxial and concentric cylindrical liner 14 having a diameter smaller than the outer cylindrical pipe 13.

As best seen in FIG. 2, the exhaust flue cap and filter device 10 includes a tubular cap 16 having a diameter larger than the outer pipe 13 so that at least a portion of the tubular cap 16 is receivable over the exhaust flue opening. In the present embodiment, the tubular cap 16 is cylindrical and concentric with the vent system 12.

The tubular cap 16, as best seen in FIGS. 2 and 4, includes an open lower end 18, an opposed open upper end 20, and a plurality of ventilation slots or vents 22 between the lower end 18 and the opposed upper end 20. Because the tubular cap 16 has an open lower end 18, atmospheric air is permitted to enter the tubular cap as shown by arrows 30 in FIG. 2. The tubular cap 16 may be fabricated from flat sheet metal or other lightweight material.

The tubular cap 16 may be configured so that a cross-section of the chimney cap is in the form of an octagon, a hexagon, a square, a rectangle, an oval, a circle, or other configuration. The ventilation slots or vents 22 may be stamped or otherwise formed into the tubular cap 16. The ventilation slots or vents 22 may be in various patterns or configurations.

A removable top 24 is attached to and closes the open upper end 18 of the tubular cap 16. The removable top 24 is shown attached to the device 10 in FIGS. 1 and 2 and is shown exploded from the device in FIG. 4. The removable top 24 may be secured by fasteners 26 or other mechanism to the tubular cap 16. The removable top 24 may likewise be fabricated from flat sheet metal or other lightweight material.

The removable cap may include an outwardly extending rain flange 28. The outwardly extending rain flange 28 has a larger diameter than the removable top 24 and the tubular cap 16 and acts as an overhang to discourage rain or precipitation from entering the ventilation slots 22.

A filter tray 40 is suspended within the tubular cap 16 and has a smaller diameter than the tubular cap 16. In one preferred embodiment, the filter tray 40 has an open bottom and an open top. As may be appreciated from FIGS. 2 and 4, the filter tray 40 includes a downwardly and outwardly extending flared skirt 42 which discourages rain and precipitation from entering the vent pipe and also encourages exhaust from the vent pipe to pass through the insert to be described.

The filter tray 40 includes a ledge 44 extending radially inward. The ledge 44 acts as a support or shoulder to hold a removable filter insert 50. In one configuration, the filter tray 40 is substantially cylindrical. The filter insert 50 is substantially cylindrical with a slightly smaller diameter than the filter tray 40 so that the filter insert 50 is received into and is supported by the filter tray.

In an alternate embodiment (not shown), the filter tray 40 may have a square cross-section (smaller than the cap 16) to accommodate a filter insert in the shape of a block.

The filter tray 40 may be suspended within the tubular cap 16 by a series of stand-offs 52 as best seen in FIG. 3. The stand-offs 52 extend radially from the filter tray 40. The outwardly flared skirt 42 of the filter tray 40 encourages exhaust gases from the vent pipe 12 to pass through the filter insert 50.

Because the filter insert 50 and the filter tray 40 have a diameter less than the tubular cap, gases such as atmospheric air are permitted to enter the base of the tubular cap 16 and travel outside of the filter tray and filter insert 50 and pass above the filter tray and filter insert within the tubular cap. The atmospheric air assists in moving the exhaust gases up and through the tubular cap 16 and assists in catalytic conversion to be described. Also, in the event of blockage of the filter insert for any reason, both exhaust gases and atmospheric air may pass through the device without blockage.

The exhaust flue cap and filter device 10 also includes a cylindrical inner collar 54 having a slightly larger diameter than the exhaust flue opening outer pipe 12 as best seen in FIG. 4. Accordingly, the inner collar 54 fits over the outer pipe 13 of the exhaust system. One or more stop tabs 48 (best seen in FIG. 4) may extend from the inner collar 54 to stop insertion of the inner collar once fully inserted. The inner collar 54 is suspended within the tubular cap 16 by a series of stand-offs 56 or by another mechanism.

The exhaust flue cap and filter device 10 may be installed by slipping the inner collar 54 over the exhaust flue vent system 12 until the stop tabs 48 abut the upper edge of the outer pipe 13. Thereafter the device 10 is secured to the outer pipe 13 thereto with fasteners 58.

The filter insert 50 may be removed and cleaned or may be replaced by removing the fasteners 26 in order to remove the removable top 24 from the tubular cap 16. Thereafter, it will be possible to access the filter insert 50 in order to remove it from the filter tray 40. A replacement filter insert may be installed in the tubular cap suspended by the filter tray 40.

The filter insert 50 may be fabricated from a number of materials in order to reduce carbon monoxide and particulate emissions from the exhaust of the gas fired appliance.

In one configuration, the filter insert 50 may be catalytically active in order to reduce carbon monoxide (CO) which escapes from the device 10. The catalytically active filter insert 50 may include a core or substrate and a washcoat including catalytically active metals. The filter insert reduces unburned hydrocarbons and carbon monoxide by oxidizing them over a metal catalyst. This catalyst aids the reaction of the carbon monoxide (CO) and hydrocarbons with the remaining oxygen in the exhaust gas and with oxygen in the atmospheric air entering the tubular cap 16. For example:

$$2CO + O_2 \Rightarrow 2CO_2$$

The catalytically active converter may include a core or substrate material and a washcoat which is comprised of catalytically active metals. The washcoat is applied to the surface of the core or substrate material so that the washcoat comes into contact with exhaust gases passing from the gas fired appliance through the device 10.

The removable filter insert 50 may be comprised of a number of materials. In a first configuration, the filter insert 50 may be a wire screen or a series of wire screens with a washcoat including a precious metal catalyst. In one non-limiting example, the wire screen may have eighth inch (⅛") square openings.

In a second embodiment, the filter insert 50 may be comprised of a ceramic block monolith having a honeycomb structure with gas flow passages which are coated with a washcoat having a precious metal catalyst.

In a third embodiment, the filter insert 50 is comprised of a metal foam with between three to five pores per inch. The filter insert includes a washcoat having a precious metal catalyst.

In a fourth configuration, the filter insert may take the form of multiple ceramic discs which are coated with a washcoat having a precious metal catalyst. In each case, the washcoat may be alumina based.

In use, exhaust gases are passed from a gas fired appliance (not shown) through the exhaust vent system 12 flue opening into the tubular cap 16 so that exhaust gases mix with atmospheric air entering the open lower end of the tubular cap 16. The atmospheric air and exhaust gases pass into and through the catalytic filter insert 50 in the tray. The exhaust gases are treated by the catalytically active filter insert 50 which promotes oxidation in order to convert excess carbon monoxide (CO) into carbon dioxide ($CO_2$). The treated gases are thereafter permitted to move from the upper end of the tubular cap 16 through the vents to the atmosphere.

A further objective of the present invention is to minimize pressure loss through the device 10. In testing of the exhaust flue cap and filter device 10 of the present invention, only a minimal pressure drop was observed as exhaust gases passed from the flue exhaust through the device.

Testing of the exhaust flue cap and filter device 10 of the present invention reveals a reduction of carbon monoxide emissions of from 20-40% but as high as 70% depending on operating conditions.

Whereas, the present invention has been described in relation to the drawings attached hereto, it should be understood that other and further modifications, apart from those shown or suggested herein, may be made within the spirit and scope of this invention.

What is claimed is:

1. An exhaust flue cap and filter device for exhaust from a gas fired appliance in communication with an exhaust flue opening having an outer pipe and a coaxial liner, which device comprises:
    a tubular cap with an open lower end for admission of atmospheric gases, an opposed open upper end, and a plurality of ventilation holes, said cap receivable over said exhaust flue opening;
    a filter tray suspended in said tubular cap by a series of stand-offs, wherein said tray has a smaller diameter than an inner diameter of said tubular cap and a ledge extending radially inward from said tray;
    a bypass space formed around said filter tray between said filter tray and said inner diameter of said tubular cap to permit passage of both exhaust gases and atmospheric air;
    a removable top attached to and closing said open upper end of said tubular cap;
    a removable filter insert receivable in said filter tray within said tubular cap supported on said ledge, said filter insert arranged to permit axial flow through said filter insert; and
    an inner collar to engage said exhaust flue opening outer pipe.

2. An exhaust flue cap and filter device as set forth in claim 1 wherein said inner collar includes at least one stop tab which engages said exhaust flue opening.

3. An exhaust flue cap and filter device as set forth in claim 1 wherein removable top is attached to said tubular cap by fasteners.

4. An exhaust flue cap and filter device as set forth in claim 1 wherein said tubular cap and said removable top are each fabricated from flat sheet metal.

5. An exhaust flue cap and filter device as set forth in claim 1 wherein said removable top includes an outwardly extending rain flange.

6. An exhaust flue cap and filter device as set forth in claim 1 wherein said tubular cap has a cross-section from the group consisting of an octagon, a hexagon, a square, a rectangle, an oval, or a circle.

7. An exhaust flue cap and filter device for a flue opening as set forth in claim 1 wherein said filter insert is a catalytically active converter.

8. An exhaust flue cap and filter device for a flue opening as set forth in claim 7 wherein said catalytically active converter includes a core or substrate and a washcoat including catalytically active metals.

9. An exhaust flue cap and filter device for a flue opening as set forth in claim 8 wherein said core or substrate is a ceramic honeycomb structure with gas flow passages.

10. An exhaust flue cap and filter device for a flue opening as set forth in claim 8 wherein said core or substrate is at least one wire screen.

11. An exhaust flue cap and filter device for a flue opening as set forth in claim 8 wherein said core or substrate is a metal foam.

12. An exhaust flue cap and filter device for a flue opening as set forth in claim 8 wherein said washcoat and catalyst are applied to a surface of said core or substrate.

13. An exhaust flue cap and filter device for a flue opening as set forth in claim 1 wherein said filter tray includes an outwardly flared skirt extending from said filter tray.

14. A process to treat carbon monoxide and unburned hydrocarbon emissions from a gas fired appliance in communication with an exhaust flue opening, which process comprises:
    passing exhaust gases from said gas fired appliance through the exhaust flue opening into a tubular cap with an open lower end, an opposed upper end, and a plurality of ventilation holes;
    permitting atmospheric air to pass into said tubular cap through said open lower end;
    permitting said exhaust gases and said atmospheric air in said tubular cap to pass into and through a catalytic filter insert supported within said tubular cap by a series of standoffs wherein said filter insert has a smaller diameter than said tubular cap;
    permitting passage of both exhaust gases and atmospheric air in a bypass space formed between said filter insert and said tubular cap;
    treating said exhaust gases with said filter insert by passing said exhaust gases and atmospheric air axially through said filter insert; and
    permitting passage of said treated gases from within said removable top through a plurality of ventilation holes in said removable top.

15. A process to treat emissions as set forth in claim 14 wherein said filter insert is a catalytic converter and wherein said step of treating emissions includes promoting oxidation with said catalytic converter.

16. An exhaust flue cap and filter device as set forth in claim 1 wherein said filter insert is for filtering said exhaust.

* * * * *